United States Patent [19]

Tice

[11] Patent Number: 4,480,469

[45] Date of Patent: Nov. 6, 1984

[54] ADJUSTABLE DIFFERENTIAL FLUID LEVEL FLOAT INDICATOR

[75] Inventor: Charles Tice, Plantsville, Conn.

[73] Assignee: Transamerica DeLaval Inc., Princeton, N.J.

[21] Appl. No.: 436,354

[22] Filed: Oct. 25, 1982

[51] Int. Cl.³ .................. G01F 23/12; H01H 36/00
[52] U.S. Cl. ............................. 73/308; 73/313; 73/DIG. 5; 200/84 C; 417/41
[58] Field of Search .................. 73/308; 200/84 C; 361/178; 417/40, 41, 118; 340/624

[56] References Cited

U.S. PATENT DOCUMENTS

| | | | |
|---|---|---|---|
| 2,784,273 | 3/1957 | Binford | 200/84 C |
| 3,114,478 | 12/1963 | Hilkemeier et al. | 222/17 |
| 3,815,416 | 6/1974 | Portis | 340/624 X |
| 3,822,657 | 7/1974 | Midkiff | 73/308 X |
| 3,935,741 | 2/1976 | Zinsmeyer et al. | 340/624 X |
| 3,982,087 | 9/1976 | Bachman | 200/84 C |
| 4,056,979 | 11/1977 | Bongort et al. | 73/313 |
| 4,186,419 | 1/1980 | Sims | 417/40 X |
| 4,329,550 | 5/1982 | Verley | 340/624 |

Primary Examiner—Daniel M. Yasich
Attorney, Agent, or Firm—Hopgood, Calimafde, Kalil, Blaustein & Judlowe

[57] ABSTRACT

The invention contemplates a float-operated electrical switching system with two fluid-level indications and with provision for mechanical adjustment of the difference in elevation between the two indicating points. The switches are magnetically actuated in accordance with proximity of a permanent magnet carried by the float. The float is guided on an upright magnetically transparent tube which houses the switches, and for at least one of the switches mechanical adjustment of elevation within the tube is available via external access at the upper end of the tube.

2 Claims, 2 Drawing Figures

ADJUSTABLE DIFFERENTIAL FLUID LEVEL FLOAT INDICATOR

BACKGROUND OF THE INVENTION

The invention relates to fluid-level indicating and control devices which involve magnetically sensitive electric switches at predetermined liquid levels, in conjunction with a float-carried permanent magnet for actuating the switches at particular levels.

In conventional devices of the character indicated, the emphasis has been on integrity of level indication, so that even if there were plural switches in a given array of switches coursed by the float magnet, it has been essential that they be at fixed and ascertained elevations, to assure reliability and accuracy of level indications resulting from switch actuations.

However, there are situations in which it is necessary to periodically adjust the distance between two fluid levels. An example of such a situation is in the control of the "stop-start" operation of a pump motor in a fluid-processing tank. But conventional devices employing float-actuation of magnetic switches do not lend themselves to such adjustment.

BRIEF STATEMENT OF THE INVENTION

It is an object of the invention to provide a float-operated electrical switching system, with two fluid-level indications and with provision for mechanical adjustment of the difference in elevation between the two indicating points.

Another object is to provide such a system as a unitary device, wherein the adjustment between the two indicating points can be made without removing or adjusting the position of the entire device.

A specific object is to meet the above objects without need to hermetically seal the entire switching system.

The invention achieves these objects using a single magnetically transparent tube, for guidance of a permanent-magnet float. Within the tube, at least one of two spaced magnetically sensitive switches is adjustably movable for selected elevation, the actuating and the setting of the adjustment being mechanical and via externally accessible means at the upper end of the tube.

DETAILED DESCRIPTION

Figure 1:
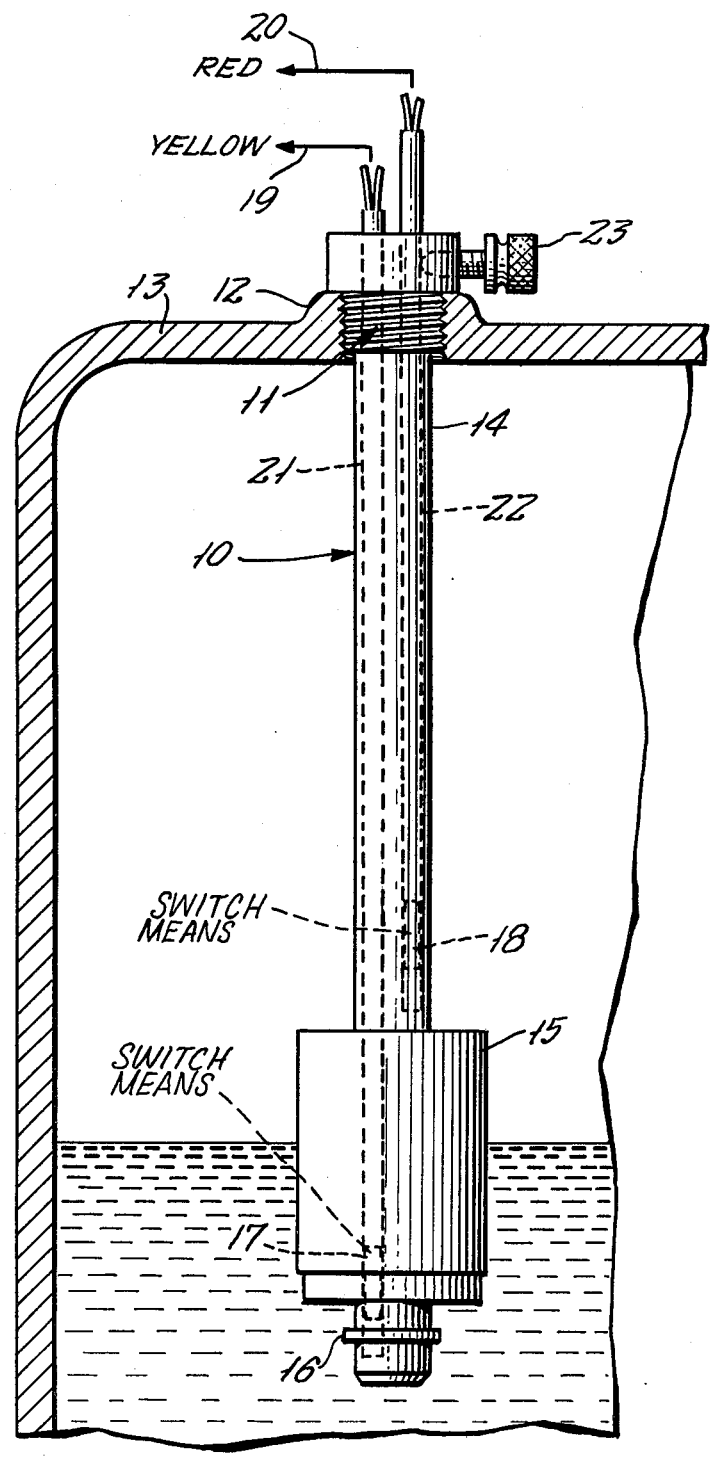
Figure 2:
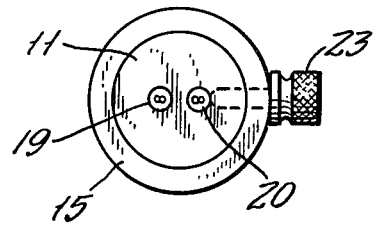

A preferred form of the invention will be described in conjunction with the accompanying drawings, in which:

FIG. 1 is a fragmentary view in vertical section, showing a tank to which level-indicating/control means of the invention has been applied; and FIG. 2 is an enlarged plan view of the level-indicating/control means of FIG. 1.

In FIG. 1, the level-indicating/control means of the invention is shown as a unitary device 10 having a threaded adapter plug fitting 11 at its upper end. Fitting 11 is mounted to a threaded boss 12 at the top of a tank 13, the liquid level of which is to be controlled within a range Δ between upper and lower limits, at least one of which is adjustable.

A tube 14 of magnetically transparent material depends from adapter 11 and provides guidance for an annular float 15 for a range Δ' of float positions which equals or exceeds the maximum for which the upper and lower limits of Δ are ever expected to function. Float 15 will be understood to contain a permanent magnet providing a field which, at sufficient proximity to magnetically sensitive switch means contained within tube 14, will effect a change of switch state. A retaining ring 16 is removably grip-retained to the lower end of tube 14, thereby providing a bottom-stop position of float 15.

In accordance with the invention, each of two different magnetically sensitive switches 17–18 is independently suspended from and positioned by the adapter 11. The lower switch 17 has leads 19 which are externally available to govern a pump-motor start and/or to provide a red-lamp indication of low level, as suggested by legend in the drawing; the upper switch 18 has similar leads 20 to govern a pump-motor stop and/or to provide a different lamp indication of high level, as suggested by the legend "Yellow". Although each of switches 17–18 could be provided with the feature of selective adjustability, such feature in the form shown is only provided for switch 18.

Each of switches 17–18 is of the magnetic-reed variety, hermetically sealed in its own glass envelope, and each is retained, as by suitable potting material, at the lower end of its own suspension tube 21 or 22. Tubes 21 and 22 are of magnetically transparent material and are of such reduced diameter as to be independently retainable within guide tube 14, as will be seen in FIG. 2. In the form shown, suspension tube 21 with the "low" switch 17 embedded therein is permanently secured to adapter 11, with switch 17 so positioned thereby as to be operable from its normally open state to its closed state, upon a descending float approach to the stop position set by retainer 16. Switch 17 closure will illustratively illuminate the red indicator lamp and/or activate a relay to start a pump motor. As rising liquid in tank 13 lifts float 15, switch 17 will open when the field of the float magnet ceases to be operative on switch 17, but it will be understood that holding-relay means (not shown) associated with the red indicator and/or with the pump motor may operate to continue such indicating or control function until actuated to its off condition, upon float-magnet actuation of the upper switch 18.

In contrast to the fixed suspension of switch 17, the upper-level switch 18 is adjustably positionable by reason of mechanical clamping means such as a knob-headed set screw 23, externally accessible for operation at the upper end of adapter 11. Such adjustment involves only a grasp of the upper projecting end of tube 22, to raise or lower the same while set screw 23 is released, and then to clamp the adjusted position via the set screw. And it will be understood that float actuation of switch 18 from its normally closed to its open condition is exactly as described for switch 17 except for the fact that switch 18 is operated to close upon float-ascending approach into sufficient proximity with switch 18.

The described device will be seen to meet all stated objects, and the description in context of indicator lamps and/or pump-motor control will be understood to be purely illustrative of a larger variety of uses. For example, it may be used in various sizes of storage tanks to indicate "high" and "low" levels, or it may be used to control a valve (not shown) for admission of fluid under pressure.

Although the invention has been described in detail for a preferred form, it will be understood that modifications may be made without departing from the scope of the invention.

What is claimed is:

1. A fluid-level transducer, comprising an elongate outer tube of material transparent to a magnetic field, said tube being adapted for vertical mounting in a region of liquid levels of interest, said tube being closed at its lower end and having a mounting adapter which effectively closes its upper end, an annular float containing a permanent magnet and surrounding said tube for guidance thereon in the course of float action in response to buoyed changes in liquid level, a first elongate suspension tube of magnetically transparent material within said outer tube and fixedly mounted to and suspended from said adapter, said first suspension tube fixedly containing a first hermetically sealed magnetically sensitive electrical switch potted in position near the lower end of said outer tube, and a selectively movable second elongate suspension tube of magnetically transparent material alongside said first suspension tube and within said outer tube and said second suspension tube being adjustably clamped to and suspended from said adapter, said second suspension tube fixedly containing a second hermetically sealed magnetically sensitive electrical switch potted in position in said second suspension tube near said adapter, the substantial range of mountable adjustment of said second suspension tube being such as to position said second switch above the effective elevation of said first magnetic switch for control activation of said second switch.

2. The transducer of claim 1, wherein mechanical means for adjustably clamping and suspending said second suspension tube and the second switch contained therein is externally accessible at said adapter.

* * * * *